United States Patent
Baek et al.

(10) Patent No.: US 10,542,425 B2
(45) Date of Patent: Jan. 21, 2020

(54) METHOD AND APPARATUS FOR REDUCING OVERHEAD FOR INTEGRITY CHECK OF DATA IN WIRELESS COMMUNICATION SYSTEM

(75) Inventors: Young-Kyo Baek, Seoul (KR); Ji-Cheol Lee, Suwon-si (KR); Jung-Je Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 12/806,861

(22) Filed: Aug. 20, 2010

(65) Prior Publication Data
US 2011/0044454 A1 Feb. 24, 2011

(30) Foreign Application Priority Data

Aug. 20, 2009 (KR) .................. 10-2009-0077039
Mar. 8, 2010 (KR) .................. 10-2010-0020566

(51) Int. Cl.
H04W 12/06 (2009.01)
H04W 12/04 (2009.01)

(52) U.S. Cl.
CPC .................. *H04W 12/04* (2013.01)

(58) Field of Classification Search
CPC .................................... H04W 12/04
USPC ........................................ 380/273
See application file for complete search history.

(56) References Cited

U.S. PATENT DOCUMENTS

| | | | |
|---|---|---|---|
| 7,630,402 B2* | 12/2009 | Un et al. | 370/469 |
| 7,962,123 B1* | 6/2011 | Yegani | G06Q 20/102 |
| | | | 370/328 |
| 2003/0091048 A1 | 5/2003 | Jiang | |
| 2007/0094492 A1 | 4/2007 | Carr | |
| 2007/0133791 A1 | 6/2007 | Han et al. | |
| 2008/0137853 A1 | 6/2008 | Mizikovsky et al. | |
| 2009/0019284 A1* | 1/2009 | Cho et al. | 713/170 |
| 2009/0081643 A1 | 3/2009 | Preminger et al. | |
| 2009/0181643 A1* | 7/2009 | Thakare | H04L 63/08 |
| | | | 455/411 |
| 2009/0196421 A1 | 8/2009 | Okuda | |

(Continued)

FOREIGN PATENT DOCUMENTS

| | | |
|---|---|---|
| CN | 101176295 | 5/2008 |
| KR | 10-2006-0097572 | 9/2006 |
| KR | 10-2009-0066116 | 6/2009 |

(Continued)

OTHER PUBLICATIONS

Baek et al., "Proposed Changes/Refinements to the Section 10.6 security of IEEE 802.16m SDD," Oct. 20, 2009.*

(Continued)

*Primary Examiner* — Andrew C Georgandellis

(57) ABSTRACT

A method and an apparatus reduce overhead for data integrity checks in a wireless communication system. When receiving a message, a first Integrity Check Value (ICV) is compared with a second ICV to detect an integrity error in the message. When the integrity error exists in the message, a frequency of the integrity error is counted. When the frequency of the integrity error is more than a threshold, a key update procedure is performed. Therefore, the overhead of the information for integrity check may be reduced in the wireless communication system.

14 Claims, 7 Drawing Sheets

(56) References Cited

U.S. PATENT DOCUMENTS

2011/0002465 A1   1/2011  Ahn et al.
2011/0044454 A1   2/2011  Back et al.

FOREIGN PATENT DOCUMENTS

| KR | 20090066116 A | 6/2009 |
|---|---|---|
| RU | 2 357 373 C2 | 5/2009 |
| WO | WO 2008/020279 A2 | 2/2008 |
| WO | WO 2011/021883 A2 | 2/2011 |

OTHER PUBLICATIONS

Zhang et al., "Reduction of Redundancy in TEK Delivery Related Management Message," Jul. 14, 2005.*
"IEEE Standard for Local and Metropolitan Area Networks," May 29, 2009.*
"IEEE Standard for Local and metropolitan area networks," 2009.*
International Search Report dated Apr. 14, 2011 in connection with International Application No. PCT/KR2010/005527.
Written Opinion of the International Searching Authority dated Apr. 14, 2011 in connection with International Application No. PCT/KR2010/005527.
Russian Office Action dated Apr. 26, 2013 in connection with Russian Patent Application No. 2012105929/08(009078), 8 pages.
Australian Examination Report dated May 7, 2013 in connection with Australian Patent Application No. 2010284792, 3 pages.
Preliminary Notice of First Office Action dated Aug. 26, 2014 in connection with Taiwanese Patent Application No. 099127775; 11 pages.
Decision on Grant dated Jul. 9, 2013 in connection with Russian Patent Application No. 2012105929/08(009078).
Office Action dated May 16, 2014 in connection with Japanese Patent Application No. 2010-183804; 6 pp.
Office Action dated Jun. 18, 2014 in connection with Australian Patent Application No. 2010284792; 2 pp.
Extended European Search Report dated Jul. 17, 2014 in connection with European Patent Application No. 10173242.8; 6 pp.
Dworkin; "Recommendation for Block Cipher Modes of Operation: The CMAC Mode for Authentication"; NIST Special Publication 800-38B; May 2005; 24 pp.
Chinese Office Action dated Jan. 27, 2014 in connection with Chinese Patent Application No. 2010102603683, 16 pages.
Jun Zhang, et al., "Reduction of Redundancy in TEK Delivery Related Management Message", IEEE 802.16, Broadband Wireless Access Working Group, Jul. 14, 2005, IEEE C802 16e-314, 4 pages.
Substantive Examination Adverse Report dated Apr. 15, 2015 in connection with Malaysian Patent Application No. PI2012000221; 4 pages.
IEEE P802.16m/D6; Part 16; Air Interface for Fixed and Mobile Broadband Wireless Access Systems; Advanced Air Interface; May 2010; 932 pages.
Japanese Office Action dated Nov. 20, 2015 in connection with Japanese Patent Application No. JP2015-012812; 10 pages.
Foreign Communication From a Related Counterpart Application, Malaysian Application No. PI 2012000221, Substantive Examination Clear Report—Section 30(1)/30(2) dated Mar. 31, 2017, 2 pages.
Foreign Communication From a Related Counterpart Application, Korean Application No. 10-2010-0020566, Notice of Final Rejection dated Jan. 12, 2017, 6 pages.
Notice of Patent Grant dated Apr. 27, 2017 in connection with Korean Patent Application No. 10-2010-0020566.
Communication from a foreign patent office in a counterpart foreign application, Intellectual Property India, "Examination report under sections 12 & 13 of the Patents Act, 1970 and the Patents Rules, 2003," Indian Application No. 5210/KOLNP/2011, Oct. 31, 2017, 6 pages.
Notice of Preliminary Rejection dated Jul. 28, 2016 in connection with Korean Application No. 10-2010-0020566, 10 pages.
Decision of Rejection dated Jul. 11, 2016 in connection with Japanese Patent Application No. 2015-012812; 6 pages.
Jun Zhang, et al., "Reduction of Redundancy in TEK Delivery Related Management Message", IEEE 802.16 Broadband Wireless Access Working Group , <http://ieee802.org/16>, 6 pages.
Shraga Avishay, et al., "16m key hierarchy and key management (AWD-SecurityDG)," ieee c80216M-09_1355, IEEE 802.16 Broadband Wireless Access Working Group, Server date Jul. 7, 2009, downloaded by EPO on Sep. 2, 2012, 9 pages.
Communication from a foreign patent office in a counterpart foreign application, European Patent Office, "Communication pursuant to Article 94(3) EPC," European Application No. EP 10 173 242.8, dated Feb. 23, 2018, 9 pages.
Communication from a foreign patent office in a counterpart foreign application, European Patent Office, "Communication pursuant to Article 94(3) EPC," Application No. EP10173242.8, dated Sep. 19, 2018, 9 pages.

* cited by examiner

METHOD AND APPARATUS FOR REDUCING OVERHEAD FOR INTEGRITY CHECK OF DATA IN WIRELESS COMMUNICATION SYSTEM

CROSS-REFERENCE TO RELATED APPLICATION(S) AND CLAIM OF PRIORITY

The present application claims the benefit under 35 U.S.C. § 119 to an application filed in the Korean Intellectual Property Office on Aug. 20, 2009 and assigned Serial No. 10-2009-0077039 and a Korean patent application filed in the Korean Intellectual Property Office on Mar. 8, 2010 and assigned Serial No. 10-2010-0020566, the entire disclosure of which is hereby incorporated by reference.

TECHNICAL FIELD OF THE INVENTION

The present invention relates to a method and an apparatus for reducing an overhead for integrity check of data in a wireless communication system. In particular, the present invention relates to an apparatus and a method for reducing an overhead caused by a Cipher-based Message Authentication Code (CMAC) added every control message when authenticating a message using a CMAC, or an overhead caused by an Integrity Check Value (ICV) added every Medium Access Control (MAC) layer Protocol Data Unit (MPDU) when encrypting MPDU according to an Advanced Encryption Standard counter (AES-CTR) mode with a Cipher Block Chaining (CBC)-MAC (CCM).

BACKGROUND OF THE INVENTION

A wireless communication system performs a verification and authentication procedure on a terminal in order to provide a service safely. Such an authentication function for a terminal emerges as a basic requirement necessary for stability of a service and stability of a network.

For example, the Institute of Electrical and Electronics Engineers (IEEE) 802.16-based wireless communication system recommends a new Privacy Key Management version 2 (PKMv2) in order to provide stronger authentication framework. The PKMv2 supports a Rivest Shamir Adleman (RSA)-based authentication scheme for mutually authenticating a terminal and a base station, and an Extensible Authentication Protocol (EAP)-based authentication scheme for performing authentication of a terminal through an upper authentication protocol. The PKMv2 performs authentication of a terminal, a base station, and a user through various combinations of these authentication schemes.

In addition, after mutual authentication between a terminal and a base station is completed in the IEEE 802.16-based wireless communication system, a Message Authentication Code (MAC) is used for authentication of a control message exchanged between the terminal and the base station. After a Traffic Encryption Key (TEK) is generated, a MAC Protocol Data Unit (MPDU) is encrypted in an AES-CCM mode using the TEK. When a message is generated at a base station or a terminal, the MAC is added at the base station and decrypted at the terminal, or added at the terminal and decrypted at the base station in order to verify that the message is not changed by a different base station or terminal.

FIG. 1 illustrates a format in which a MAC is added to a control message according to the principles of the present disclosure. For the MAC, a Cipher based Message Authentication Code (CMAC) and a Keyed-Hash Message Authentication Code (HMAC) are used. A situation in which the CMAC is generated and added to a control message is described.

Referring to FIG. 1, when a control message is generated, a base station or a terminal generates a CMAC 110, adds it to the last portion of the control message 100, and transmits the control message 100 to which the CMAC 110 has been added to a terminal or a base station. When receiving the control message 100 including the CMAC 110, a terminal or a base station in a reception side generates a CMAC in the same way as the base station or terminal in the transmission side and performs an integrity check of the control message by comparing the generated CMAC with the CMAC of the received control message. The CMAC is generated based on Equation (1).

$$\begin{aligned}
&\text{CMAC:=Truncate(AES-MAC(CMAC\_KEY\_*,} \\
&\quad \text{AKID|CMAC\_PN\_*|STID|FID|24-bit zero} \\
&\quad \text{padding|MAC\_Control\_Message),64)}
\end{aligned}$$

$$\begin{aligned}
&\text{CMAC\_KEY\_U|CMAC\_KEY\_D=Dot 16 KDF} \\
&\quad \text{(CMAC-TEK prekey, "CMAC KEYS", 256)}
\end{aligned}$$

$$\begin{aligned}
&\text{AKID=Dot16KDF(AK, 0b0000|PMK SN|AMSID*} \\
&\quad \text{or MS MAC address|BSID|"AKID", 64)}
\end{aligned}$$

$$\begin{aligned}
&\text{CMAC-TEK prekey=Dot16KDF (AK, AK\_COUN-} \\
&\quad \text{T|"CMAC-TEK prekey", 160)}
\end{aligned}$$

$$\begin{aligned}
&\text{AMSID*=Dot16KDF(MS MAC address|80-bit zero} \\
&\quad \text{padding, NONCE\_AMS, 48)} \quad\quad\quad \text{(1) [Eqn. 1]}
\end{aligned}$$

The CMAC is generated by selecting the lower 64 bits (=8 bytes) of 128 bits, which are result values of AES-CMAC (refer to Internet Engineering Task Force Request for Comment (IETF RFC) 4493) according to Equation (1).

Here, CMAC_KEY_* is the CMAC_KEY for Uplink/Downlink generated from an Authentication Key (AK), CMAC_PN_* is a value that increases by 1 whenever a control message is transmitted and is a packet number counter value for Uplink/Downlink. STID is an identifier allocated to a relevant terminal, BSID is an identifier of a relevant base station, FID (Flow ID) is an identifier allocated to connection of a relevant terminal, MAC_Control_Message is control message contents to be transmitted, and NONCE_AMS is a random number generated by an AMS during network entry. Though CMAC generation has been exemplarily described for message authentication in FIG. 1, HMAC may be used as a control message.

FIG. 2 illustrates a format in which an integrity check value is added to MPDU according to the principles of the present disclosure.

Referring to FIG. 2, when an MPDU including a MAC header 200 and a plaintext payload 210 is generated, the L-byte plaintext payload 210 is encrypted based on an AES-CCM scheme, a Packet Number (PN) 202 is added to a front portion of the encrypted plaintext payload 211, and a 8-byte Integrity Check Value (ICV) is added to a rear portion of the encrypted plaintext payload 211, such that an encrypted MPDU is formed. Consequently, the encrypted MPDU includes the MAC header 200, the PN 202, the encrypted plaintext payload 211, and an Integrity Check Value 220. Therefore, when receiving the encrypted MPDU, a reception side decodes the encrypted MPDU and determines whether the ICV 220 is valid to check the integrity of the MPDU.

The 8-byte ICV 220 is generated according to an AES-CCM scheme using a Traffic Encryption Key (TEK), a MAC header, a PN, and a plaintext payload as inputs.

As described above, for integrity check of a control message and an MPDU, an overhead of 8 bytes (that is, 64 bits) is added. The overhead increases in proportion to the number of control messages or the number of MPDUs. This may act as a factor that deteriorates system performance.

Therefore, there is a need for an alternative for reducing the size of an authentication overhead for a control message and an MPDU in a wireless communication system.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide a method and an apparatus for reducing a size of a MAC for checking integrity of a control message in a wireless communication system.

Another aspect of the present invention is to provide a method and an apparatus for reducing a size of an ICV for checking integrity of a MPDU in a wireless communication system.

Still another aspect of the present invention is to provide a method and an apparatus for, when decoding an MPDU encrypted according to an AES-CCM scheme fails, determining whether the failure is due to non-coincidence of a TEK or due to invalidity of an ICV to process the MPDU.

In accordance with an aspect of the present invention, a method for reducing an overhead of information for integrity check in a wireless communication system is provided. The method includes, when receiving a message, comparing a first Integrity Check Value (ICV) with a second ICV to detect an integrity error of the received message. The method also includes, when the integrity error exists in the received message, counting a frequency of the integrity error. When the frequency of the integrity error is more than a threshold, a key update procedure performed.

In accordance with another aspect of the present invention, an apparatus for reducing an overhead of information for integrity check in a wireless communication system is provided. The apparatus includes a message authenticator for that compares a first Integrity Check Value (ICV) with a second ICV to detect an integrity error of the message when receiving a message. A data processor counts a frequency of the integrity error when the integrity error exists in the message. A controller performs a key update procedure when the frequency of the integrity error is not greater than a threshold.

In accordance with still another aspect of the present invention, a method for reducing an overhead for a Cipher-based Message Authentication Code (CMAC) of a control message in a wireless communication system is provided. The method includes comparing a first Pair-wise Master Key (PMK) Sequence Number (SN) used for the control message with a second AK SN to determine whether the control message is valid when receiving a control message. The method also includes checking whether a CMAC included in the control message is valid. When the CMAC is invalid, a frequency of generation of the control message including the invalid CMAC is counted. And when the frequency of generation of the control message including the invalid CMAC is more than a predetermined threshold, an AK is updated.

In accordance with yet another aspect of the present invention, a method for reducing an overhead for integrity check of a Media Access Control (MAC) Protocol Data Unit (MPDU) in a wireless communication system is provided. The method includes, on receiving an MPDU, comparing an Encryption Key Sequence (EKS) of a first Traffic Encryption Key (TEK) used for the MPDU with an EKS of a second TEK to determine whether the MPDU is valid and determining whether an Integrity Check Value (ICV) included in the MPDU is valid. When the ICV is invalid, a frequency of generation of the MPDU including the invalid ICV is counted. And when the frequency of generation of the MPDU including the invalid ICV is more than a predetermined threshold, a TEK is updated.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

FIGS. 3 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, detailed descriptions of well-known functions or constructions will be omitted since they would obscure the invention in unnecessary detail. Also, the terms used herein are defined according to the functions of the present invention. Thus, the terms may vary depending on the user's or operator's intent or practice. Therefore, the terms used herein should be understood based on the descriptions made herein.

Embodiments of the present invention provide a method and an apparatus for reducing an overhead for data integrity in a wireless communication system. More particularly, embodiments of the present invention provide a method and an apparatus for counting a frequency of generation of an invalid control message and an MPDU, and when the frequency of generation exceeds a predetermined frequency, newly generating an Authentication Key (AK) or Traffic Encryption Key (TEK) to reduce an overhead for integrity check.

Figure 1:
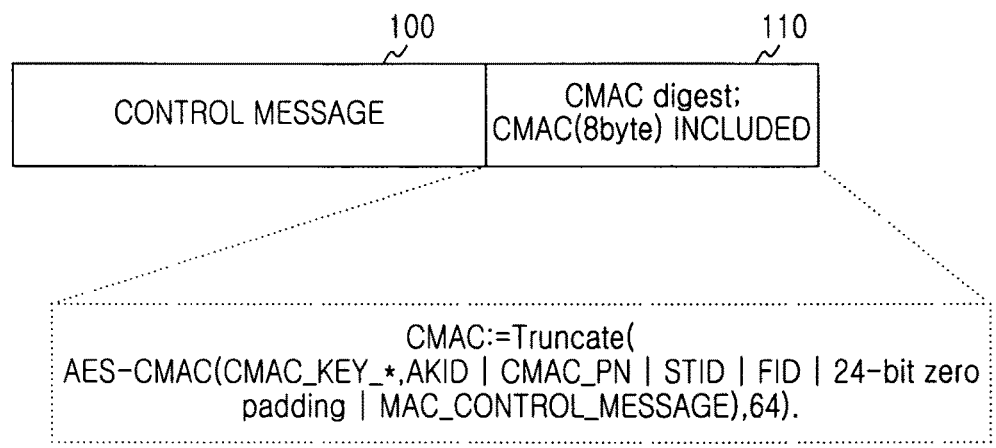
FIG. 1 illustrates a message format in which a MAC is added to a control message according to the principles of the present disclosure.
Figure 2:
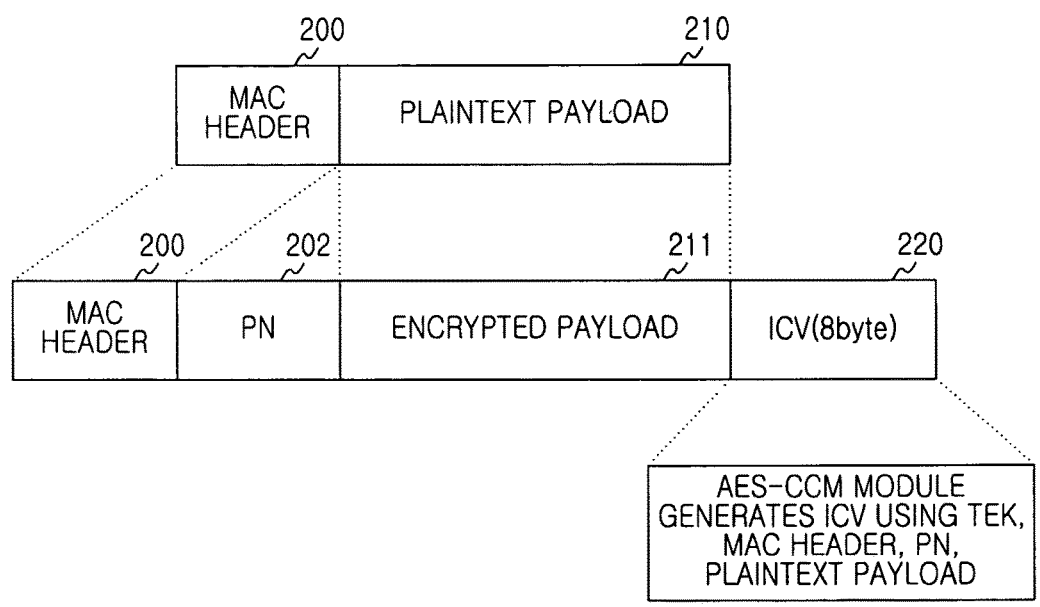
FIG. 2 illustrates a format in which an integrity check value is added to MPDU according to the principles of the present disclosure.
Figure 3:
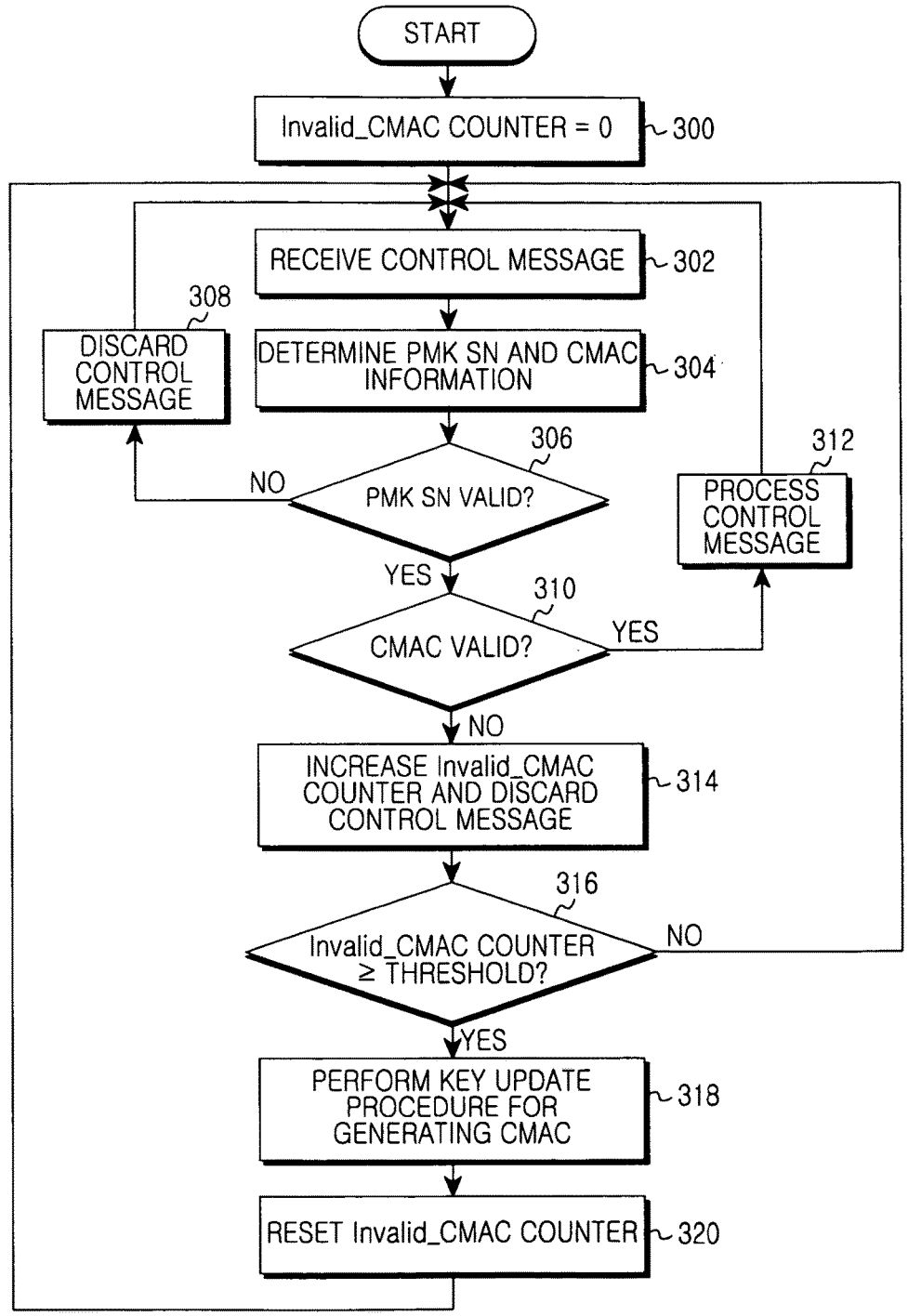
FIG. 3 illustrates a process for reducing an overhead for integrity check of a control message in a wireless communication system according to an embodiment of the present invention.

FIG. 3 illustrates a process for reducing an overhead for integrity check of a control message in a wireless communication system according to an embodiment of the present invention.

Referring to FIG. 3, the base station initializes Invalid_Cipher-based Message Authentication Code (CMAC) COUNTER for counting integrity of a control message received from a terminal to '0' in block 300.

The base station receives a control message including a CMAC for integrity check of a control message from the terminal in block 302. The CMAC is generated by the terminal using at least one of CMAC_KEY, AKID, CMAC_PN, STID, FID, MAC_control_Message information according to Equation (1). In the conventional art, the CMAC has a size of 64 bits (8 bytes), but in an embodiment of the present invention, 32 bits (4 bytes) are used.

The base station extracts the PMK Sequence Number (SN) and CMAC used by the terminal to generate CMAC from the control message that includes the CMAC in block 304. The PMK is derived from a Pair-wise Master Key (PMK).

The base station compares the AK SN used by the terminal to generate CMAC with the PMK SN negotiated during a mutual authentication procedure to check validity of the control message or the AK in block 306.

When the control message is invalid, the base station discards the control message and waits for the next control message or a retransmitted control message in block 308. Also, in another embodiment, the base station may check validity of the control message received from the terminal using a CMAC included in the control message.

In contrast, when the received control message is valid, that is, when AK SN included in the received control message and used for generating the CMAC is valid in block 306, the base station checks validity of the CMAC included in the control message received from the terminal in block 310. In other words, the base station checks integrity of the control message received from the relevant terminal by checking whether the CMAC included in the control message received from the terminal is the same as the CMAC generated by the base station.

When the CMAC included in the control message received from the terminal is valid, the base station normally processes the received control message and waits for the next control message in block 312.

In contrast, when CMAC included in the control message received from the terminal is not valid, the base station counts the frequency of generation of invalid CMAC by incrementing Invalid_CMAC COUNTER by '1', and discards the received control message in block 314.

When the increased Invalid_CMAC COUNTER is determined to be less than a predetermined threshold in block 316, the base station maintains the AK currently in use and waits for the next control message or a control message to be retransmitted.

When the increased Invalid_CMAC COUNTER is greater than or equal to the predetermined threshold, the base station updates the AK used for generating the CMAC in block 318. Detailed description is made with reference to FIGS. 5 and 6. Alternatively, the PMK from which the AK is derived may be updated instead of the AK.

The base station resets Invalid_CMAC COUNTER to '0' whenever AK is updated in block 320.

As described above, an embodiment of the present invention uses a CMAC value of 4 bytes, which is a smaller overhead than that of the conventional art, but counts a generation frequency by which an invalid message passes through an integrity check, and updates a key for generating CMAC depending on a result thereof (e.g. when the generation frequency is equal to or greater than $2^{12}$), such that the $2^{-20}$ probability that an invalid message passes through integrity check is met. That is, when a required risk is $2^{-20}$ and a generation frequency by which an invalid message passes through integrity check is equal to or greater than $2^{12}$, a size of CMAC may be equal to or greater than log (threshold/risk) according to a National Institute of Standards and Technology (NIST) standard, such that a security level may be maintained using only CMAC of 32 bits, i.e. 4 bytes.

In contrast, the conventional art does not count a generation frequency by which an invalid message passes through integrity check.

Though FIG. 3 illustrates a situation in which a base station receives a control message from a terminal, the foregoing description is also applicable when a terminal receives a control message from a base station.

Figure 4:
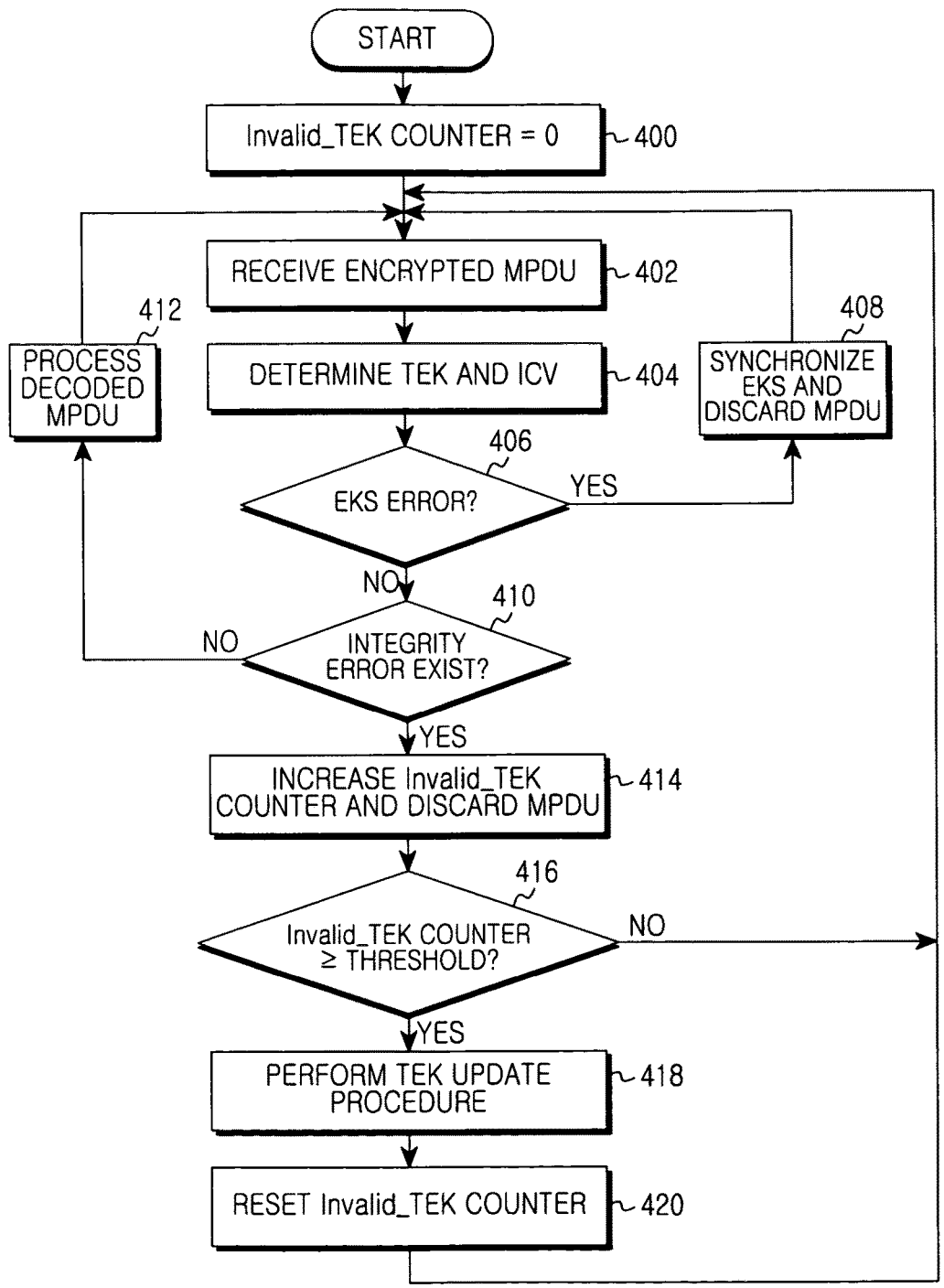
FIG. 4 illustrates a process for reducing an overhead for integrity check of an MPDU encrypted based on an AES-CCM in a wireless communication system according to an embodiment of the present invention.

FIG. 4 illustrates a process for reducing an overhead for integrity check of an MPDU encrypted based on an AES-CCM in a wireless communication system according to an embodiment of the present invention. Advanced Encryption Standard (AES) is a sequence-open type symmetric key encryption scheme replaced by the NIST as the next generation international standard code of a Data Encryption Standard (DES).

Referring to FIG. 4, the base station initializes Invalid_TEK COUNTER for counting integrity of MPDU encrypted using AES-CCM and received by a terminal to '0' in block 400.

The base station receives an MPDU including an Integrity Check Value (ICV) for integrity check of the MPDU from the terminal in block 402. The ICV is generated in a Cipher Block Chaining MAC (CCM) mode using at least one of a TEK, a MAC header, a PN, and a plaintext payload.

The base station extracts a TEK used by the terminal to generate the ICV and the ICV from the MPDU including the ICV received from the terminal in block 404.

When the base station checks the Encryption Key Sequence (EKS) for the TEK used for encryption and the EKS is invalid in block 406, the base station allows the terminal to synchronize with the TEK and discards the received MPDU in block 408. To synchronize with the TEK, the base station transmits an Invalid_TEK message to the terminal, and the terminal that has received the Invalid_TEK message performs a key negotiation with the base station to synchronize with a TEK of the base station. A synchronization procedure of a TEK is described with reference to FIGS. 7 and 8.

In contrast, when the EKS is valid, the base station decodes the MPDU received from the relevant terminal to check the ICV in block 410.

When the ICV is valid, the base station normally processes MPDU in block 412. In contrast, when the ICV is not valid, the base station counts a generation frequency of an invalid ICV by incrementing Invalid_TEK COUNTER by '1', and discards the received MPDU in block 414.

When the increased Invalid_TEK COUNTER is less than a predetermined threshold in block 416, the base station maintains a TEK currently in use and waits for the next MPDU or MPDU to be retransmitted.

When the increased Invalid_TEK COUNTER is greater than or equal to the predetermined threshold in block 416, the base station updates to a new TEK in block 418. Here, the TEK is updated first by the base station.

A TEK update procedure under an environment where a base station receives an MPDU from a terminal is described. When Invalid_TEK COUNTER is equal to or greater than the predetermined threshold, the base station discards an existing TEK_D and replaces it with an existing TEK_U (TEK_D:=TEK_U). In addition, the base station increments COUNTER_TEK by '1' to generate a new TEK using Equation (2) (TEK_U:=new TEK). In addition, to expedite a TEK update procedure, the base station transmits a message indicating that the TEK is not valid to the terminal.

At this point, since the base station continues to use TEK_U or TEK_D that has a higher risk of exposure, which means some attackers may obtain the TEKs by eavesdropping, to reduce a risk of exposure, the base station performs a TEK update procedure one more time after a terminal recognizes TEK update ends during the TEK update procedure, such that the base station discards TEK_D that has a risk of exposure and generates a new TEK to allow both TEK_D and TEK_U to get out of an exposure risk.

In addition, the base station may perform the TEK update procedure based on a Key agreement process or a reauthentication process.

A base station transmits a key agreement MSG#1 message to a terminal to perform a key agreement process. Upper encryption keys such as PMK and AK are updated through the key agreement process, such that TEK update is induced. At this point, since TEK_U and TEK_D are keys generated from a previous upper encryption key (for example, AK) in the TEK update process, a base station uses TEK_U as TEK_D and generates a new TEK to use the same as TEK_U. When the terminal recognizes TEK update ends, the base station discards TEK_D one more time, uses TEK_U as TEK_D, and generates a new TEK to use the same as TEK_U, such that the base station discards TEK that has a risk of exposure through two times of TEK update process.

In other words, during a first TEK update process, a first TEK_U is set as a first TEK_D, a previous TEK_D is discarded, and a new TEK is generated and set as a second TEK_U. After that, during a second TEK update process, the second TEK_U is set as a second TEK_D, the first TEK_D is discarded, and a new TEK is generated and set as a third TEK_U.

Meanwhile, during the reauthentication process, a base station transmits an Extensible Authentication Protocol (EAP)-Transfer message to a terminal to allow the terminal to perform a network reauthentication process. After the reauthentication process ends, the base station discards TEK that has a risk of exposure through two iterations of TEK update process by performing the key agreement process.

A TEK update procedure in an environment where a terminal receives an MPDU from a base station is described. When Invalid_TEK COUNTER is equal to or greater than a predetermined threshold, the terminal transmits an Invalid_TEK message to inform the base station of the result. When receiving the Invalid_TEK message from the terminal, the base station discards an existing TEK_D and replaces it with an existing TEK_U (TEK_D:=TEK_U). Also, the base station increments COUNTER_TEK by '1' to generate a new TEK using Equation (2) (TEK_U:=new TEK).

After that, upon recognizing that the MPDU received from the base station is encrypted using TEK_U held by the terminal, the terminal transmits a key request (including Security Association ID (SAID)) message to a base station, and the base station transmits a key reply message (including SAID, AK, SN, COUNTER_TEK) to the terminal. In addition, when COUNTER_TEK is updated, the terminal updates TEK. That is, the terminal discards an existing TEK_D and replaces it with an existing TEK_U (TEK_D:= TEKU). In addition, the terminal generates a new TEK by incrementing COUNTER_TEK by '1' using Equation (2).

The TEK is generated based on Equation (2).

$$TEK_i = Dot16KDF\ (CMAC\text{-}TEK\ prekey, SAID|COUNTER\_TEK=i|\text{"TEK"}, 128)$$

$$CMAC\text{-}TEK\ prekey = Dot16KDF\ (AK, AK\_COUNT|\text{"CMAC-TEK prekey"}, 160) \qquad [\text{Eqn. 2}]$$

Here, TEK is generated from AK and remains the same during the lifetime of AK.

In addition, COUNTER_TEK is incremented by '1' whenever a new TEK is generated, Security Association ID (SAID) is an identifier of SA to which TEK corresponds, the terminal and the base station have two TEKs (TEK_U is used when the terminal performs encryption, and TEK_D is used when the base station performs encryption). During decoding, TEK (one of TEK_U and TEK_D) used when a transmitter performs decryption is used.

The base station resets Invalid_TEK COUNTER to '0' whenever the TEK is updated in block 420.

As described above, an embodiment of the present invention uses an ICV of 4 bytes, which is a smaller overhead than that of the conventional art, but counts a generation frequency by which an invalid MPDU passes through an integrity check, and updates TEK for generating ICV depending on a result thereof (e.g. when the generation frequency is equal to or greater than $2^{12}$), such that the $2^{-20}$ probability that an invalid MPDU passes through integrity check is met. That is, when a required risk is $2^{-20}$ and a generation frequency by which an invalid MPDU passes through integrity check is equal to or greater than $2^{12}$, a size of ICV may be equal to or greater than log (threshold/risk) according to a NIST standard, such that a security level may be maintained using only ICV of 32 bits, that is, 4 bytes.

In contrast, the conventional art does not count a generation frequency by which an invalid MPDU passes through integrity check.

Though FIG. 4 illustrates a situation in which a base station receives an MPDU from a relevant terminal, the foregoing description is also applicable when a terminal receives the MPDU from a relevant base station.

Figure 5:
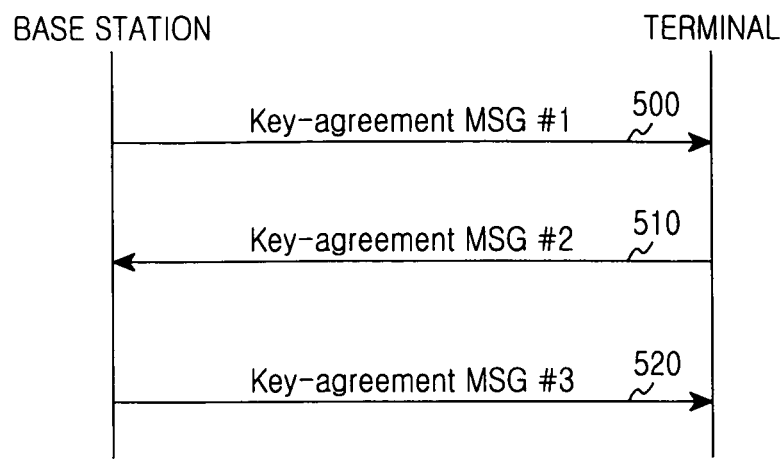
FIG. 5 illustrates a signal flow for updating an encryption key (PMK and AK) when a base station receives a control message from a relevant terminal according to an embodiment of the present invention.

FIG. 5 illustrates a signal flow for updating an encryption key (PKM and AK) when a base station receives a control message from a relevant terminal according to an embodiment of the present invention.

When Invalid_CMAC COUNTER becomes a predetermined frequency, the base station transmits a Key_agreement MSG#1 message 500 to the terminal in order to update a new encryption key (PMK and AK).

When receiving the Key_agreement MSG#1 message 500, the terminal transmits a Key_agreement MSG#2 message 510 to the base station.

The base station transmits a Key_agreement MSG#3 message 520 to the relevant terminal in response to the Key_agreement MSG#2 message 510.

Therefore, the terminal and the base station share a new encryption key (PKM and AK) between them by exchanging necessary information to update AK or PKM through a Key_agreement message. Those key agreement messages are used to confirm validity of the new key (PMK and AK). After successful key agreement the new key can be applied to other control messages and MPDUs.

Figure 6:
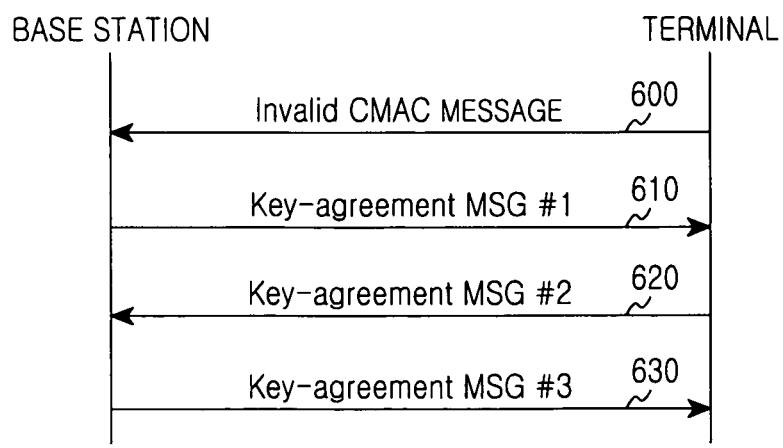
FIG. 6 illustrates a signal flow for updating an encryption key (PMK and AK) when a terminal receives a control message from a base station according to an embodiment of the present invention.

FIG. 6 illustrates a signal flow for updating an encryption key (PKM and AK) when a terminal receives a control message from a base station according to an embodiment of the present invention.

When Invalid_CMAC COUNTER becomes a predetermined frequency, the terminal transmits an Invalid CMAC message 600 informing this to the base station.

When receiving the Invalid CMAC message 600, the base station transmits a Key_agreement MSG#1 message 610 to the relevant terminal in order to update a new encryption key (PMK and AK).

When receiving the Key_agreement MSG#1 message 610, the terminal transmits a Key_agreement MSG#2 message 620 to the base station.

The base station transmits a Key_agreement MSG#3 message 630 to the relevant terminal in response to the Key_agreement MSG#2 message 620.

Therefore, the terminal and the base station share a new encryption key (PKM and AK) between them by exchanging necessary information to update AK or PKM through a Key_agreement message. Those key agreement messages are used to confirm validity of the new key (PMK and AK). After successful key agreement the new key can be applied to other control messages and MPDUs.

Figure 7:
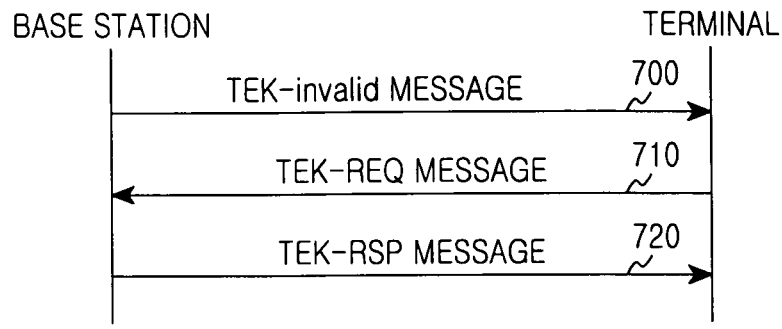
FIG. 7 illustrates a signal flow for updating an encryption key (TEK or EKS) when a base station receives an MPDU from a relevant terminal according to an embodiment of the present invention.

FIG. 7 illustrates a signal flow for updating an encryption key (TEK) when a base station receives an MPDU from a terminal according to an embodiment of the present invention.

Referring to FIG. 7, when EKS is not valid, the base station transmits an Invalid TEK message 700 to a terminal.

The terminal that has received the Invalid TEK message 700 transmits a TEK-REQ message 710 to the base station.

The base station transmits a TEK-RSP message 720 to the terminal in response to the TEK-REQ message 710.

Therefore, the relevant terminal and the base station use the same TEK between them by sharing information for generating TEK because TEK-REQ notices its associated SA and its response TEK-RSP replies EKS, PMK SN and COUNTER_TEK which ABS maintains about the SA noticed in the TEK-REQ.

Figure 8:
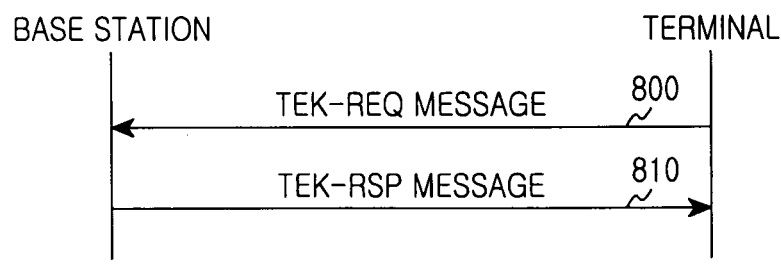
FIG. 8 illustrates a signal flow for updating an encryption key (TEK or EKS) when a base station receives an MPDU from a relevant terminal according to an embodiment of the present invention.

FIG. 8 illustrates a signal flow for updating an encryption key (TEK) when a base station receives an MPDU from a relevant terminal according to an embodiment of the present invention.

Referring to FIG. 8, when EKS is not valid, the terminal transmits a TEK-REQ message 800 to the base station.

The base station transmits a TEK-RSP message 810 to the terminal in response to the TEK-REQ message 800.

Therefore, the relevant terminal and the base station use the same TEK between them by sharing information for generating TEK because TEK-REQ notices its associated SA and its response TEK-RSP replies EKS, PMK SN and COUNTER_TEK which ABS maintains about the SA noticed in the TEK-REQ.

Figure 9:
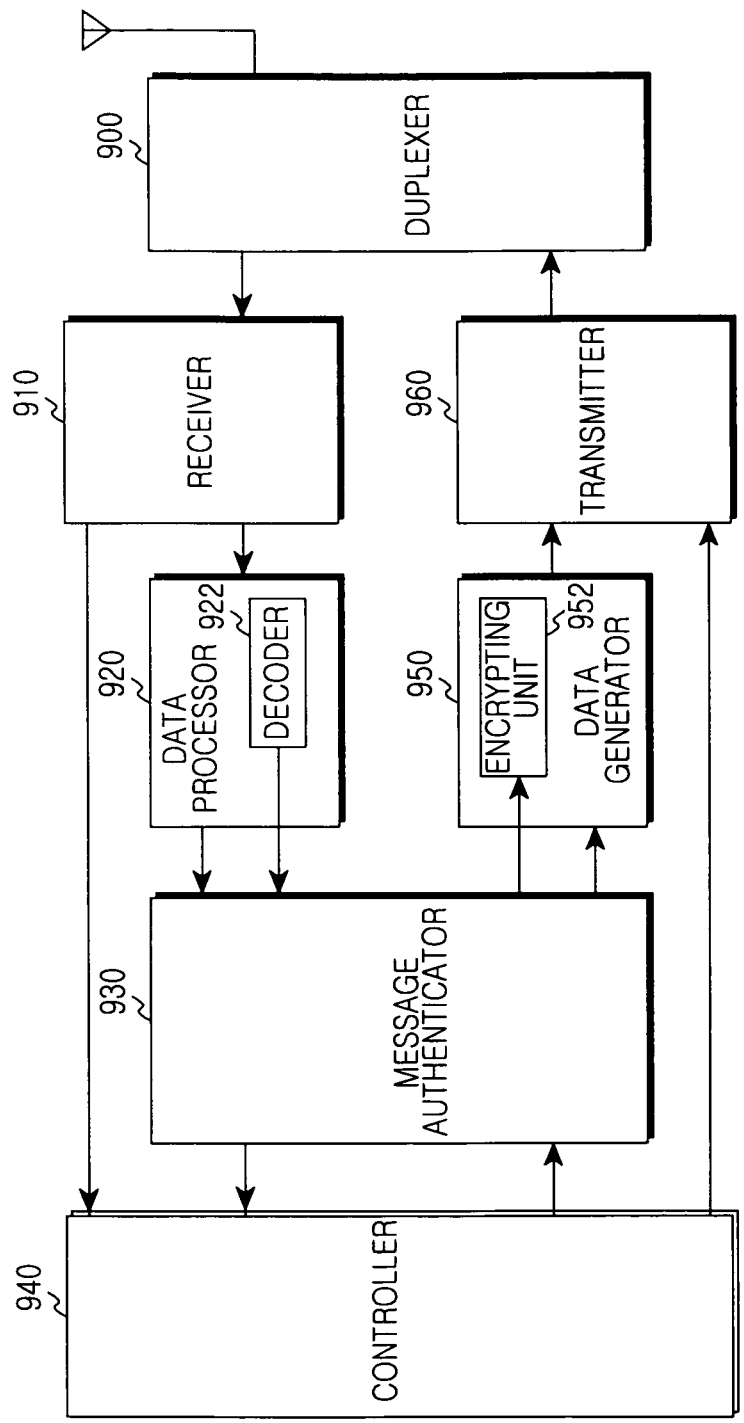
FIG. 9 illustrates an apparatus for reducing an overhead for integrity check of data in a wireless communication system according to some embodiments of the present invention.

FIG. 9 illustrates an apparatus (base station or terminal) for reducing an overhead for integrity check of data in a wireless communication system, according to embodiments of the present invention. FIG. 9 will first be described according to an operation of a terminal, and then be described according to an operation of a base station.

Referring to FIG. 9 according to an operation of a terminal, the terminal includes a duplexer 900, a receiver 910, a data processor 920, a message authenticator 930, a controller 940, a data generator 950, and a transmitter 960.

The duplexer 900 transmits a transmission signal provided by the transmitter 960 via an antenna, and provides a reception signal from the antenna to the receiver 910 according to a duplexing scheme. For example, in a Time Division Duplexing (TDD) scheme, the duplexer 900 transmits a transmission signal provided by the transmitter 960 via the antenna during a transmission section, and provides a reception signal from the antenna to the receiver 910 during a reception section.

The receiver 910 converts a Radio Frequency (RF) signal provided by the duplexer 900 into a baseband signal, and demodulates and decodes the baseband signal. For example, the receiver 910 includes an RF process block, a demodulation block, and a channel-decoding block. The RF process block converts an RF signal received via the antenna into a baseband signal. The demodulation block converts a signal provided by the RF process block into a signal in a frequency domain by performing Fast Fourier Transform (FFT). The channel-decoding block may include a demodulator, a deinterleaver, and a channel decoder.

At this point, the receiver 910 receives a signal using an allocated terminal identifier. In addition, the receiver 910 provides control information checked by demodulation and decoding to the controller 940, and provides data to the data processor 920.

The data processor 920 detects a packet from data received from the receiver 910. After that, the data processor 920 determines whether the packet is a control message and whether the packet is encrypted using header information of the detected packet.

When the packet is a control message, the data processor 920 extracts a control message from the relevant packet and transmits the same to the message authenticator 930.

When the packet is encrypted, the data processor 920 transmits the relevant packet to a decoder 922. The decoder 922 determines validity of the relevant packet using EKS and ICV of the packet provided by the data processor 920. When EKS is not valid, the controller 940 generates a KEY-REQ message and transmits the same together with authentication information to a base station via the message authenticator 930, and receives a KEY-RSP message from the base station in response to the KEY-REQ message to receive information regarding TEK currently used by the base station.

Also, when the ICV of the packet is not valid, the decoder 922 counts the number of Invalid_TEK COUNTER. When the Invalid_TEK COUNTER reaches a predetermined number, the controller 940 generates an Invalid TEK message and transmits the same together with authentication information to the base station via the message authenticator 930, such that the base station updates TEK. When the packet is valid, the decoder 922 decodes the relevant packet to process the packet.

The message authenticator 930 determines whether a control message provided by the data processor 920 is valid. At this point, when AKID used for generating CMAC is valid, the message authenticator 930 determines whether the CMAC value is valid. When determining that the CMAC value is not valid, the message authenticator 930 counts the number of Invalid_CMAC COUNTER. When the Invalid_CMAC COUNTER reaches a predetermined number, the controller 940 generates an Invalid CMAC message and transmits the same together with authentication information to the base station via the message authenticator 930. The base station sends Key_agreement MSG#1 to update an encryption key (that is, PMK and AK) through a key agreement procedure. A control message in which CMAC is valid is transmitted to the controller 940.

Also, when receiving control information that requires message authentication from the controller 940, the message authenticator 930 adds a CMAC to the control information to transmit the same to the data generator 950. At this point, the message authenticator 930 generates the CMAC using AK generated using information of a target base station obtained through an EAP.

The data generator 950 generates and outputs a packet including control information provided by the message authenticator 930. For example, the data generator 950 generates a packet including an Invalid CMAC message to which a CMAC provided by the message authenticator 930 has been added, and an Invalid TEK message.

The transmitter 960 converts data provided by the data generator 950 and control information provided by the controller 940 into an RF signal to transmit the same to the duplexer 900. For example, the transmitter 960 includes a channel-coding block, a modulation block, and an RF process block. The channel-coding block includes a channel encoder, an interleaver, and a modulator. The modulation block converts a signal provided by the modulator into a signal in a time domain by performing Inverse Fast Fourier Transform (IFFT). The RF process block converts a baseband signal provided by the modulation block into an RF signal to transfer the same to the duplexer 900.

In the above embodiment, the controller 940 and the message authenticator 930 are configured independently. In another embodiment, the controller 940 and the message authenticator 930 may be configured in one module.

Referring to FIG. 9 according to an operation of a base terminal, the base station includes a duplexer 900, a receiver 910, a data processor 920, a message authenticator 930, a controller 940, a data generator 950, and a transmitter 960.

The duplexer 900 transmits a transmission signal provided by the transmitter 960 via an antenna, and provides a reception signal from the antenna to the receiver 910 according to a duplexing scheme. For example, when using a Time Division Duplexing (TDD) scheme, the duplexer 900 transmits a transmission signal provided by the transmitter 960 via the antenna during a transmission section, and provides a reception signal from the antenna to the receiver 910 during a reception section.

The receiver 910 converts a Radio Frequency (RF) signal provided by the duplexer 900 into a baseband signal, and demodulates and decodes the baseband signal. For example, the receiver 910 includes an RF process block, a demodulation block, and a channel-decoding block. The RF process block converts an RF signal received via the antenna into a baseband signal. The demodulation block converts a signal provided by the RF process block into a signal in a frequency domain by performing Fast Fourier Transform (FFT). The channel-decoding block may include a demodulator, a de-interleaver, and a channel decoder.

At this point, the receiver 910 receives a signal of a relevant mobile station using a used mobile station identifier. In addition, the receiver 910 provides control information checked by demodulation and decoding to the controller 940, and provides data to the data processor 920.

The data processor 920 detects a packet from data received from the receiver 910. After that, the data processor 920 determines whether the packet is a control message and whether the packet is encrypted using header information of the detected packet.

When the packet is a control message, the data processor 920 extracts a control message from the relevant packet and transmits the same to the message authenticator 930.

When the packet is encrypted, the data processor 920 transmits the relevant packet to a decoder 922. The decoder 922 determines validity of the relevant packet using EKS and ICV of the packet provided by the data processor 920. When EKS is not valid, the controller 940 generates a KEY-REQ challenge message and transmits the same together with authentication information to a terminal via the message authenticator 930, and receives a KEY-REQ message from the terminal in response to the KEY-REQ challenge message to transmit information regarding TEK currently in use to the terminal through a KEY-RSP message in response to the KEY-REQ message.

Also, when the ICV of the packet is not valid, the decoder 922 counts the number of Invalid_TEK COUNTER. When the Invalid_TEK COUNTER reaches a predetermined number, the controller 940 updates TEK. In contrast, when the packet is valid, the decoder 922 decodes the relevant packet to process the packet.

The message authenticator 930 determines whether a control message provided by the data processor 920 is valid. At this point, when AKID used for generating CMAC is valid, the message authenticator 930 determines whether the CMAC value is valid. When determining that the CMAC value is not valid, the message authenticator 930 counts the number of Invalid_CMAC COUNTER. When the Invalid_CMAC COUNTER reaches a predetermined number, the message authenticator 930 generates a Key_agreement MSG#1 message through the controller 940, transmits the same together with authentication information to the terminal via the message authenticator 930, and updates encryption keys (that is, PMK and AK) through a key agreement procedure. A control message in which CMAC is valid is transmitted to the controller 940.

Also, when receiving control information that requires message authentication from the controller 940, the message authenticator 930 adds a CMAC to the control information to transmit the same to the data generator 950. At this point, the message authenticator 930 generates the CMAC using AK generated using information of the base station obtained through an EAP.

The data generator 950 generates and outputs a packet including control information provided by the message authenticator 930. For example, the data generator 950 generates a packet including a key_agreement MSG#1 to which a CMAC provided by the message authenticator 930 has been added.

The transmitter 960 converts data provided by the data generator 950 and control information provided by the controller 940 into an RF signal to transmit the same to the duplexer 900. For example, the transmitter 960 includes a channel-coding block, a modulation block, and an RF process block. The channel-coding block includes a channel encoder, an interleaver, and a modulator. The modulation block converts a signal provided by the modulator into a signal in a time domain by performing Inverse Fast Fourier Transform (IFFT). The RF process block converts a baseband signal provided by the modulation block into an RF signal to transfer the same to the duplexer 900.

In the above embodiment, the controller 940 and the message authenticator 930 are configured independently. In another embodiment, the controller 940 and the message authenticator 930 may be configured in one module.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

As described above, a wireless communication system performs integrity check for a control message and an MPDU, counts the number of generation of invalid messages, and changes an AK or an encryption key before the number of generation of invalid messages reaches a security danger level, such that a predetermined security level may be maintained even when a smaller CMAC (or ICV) than the conventional art is used.

What is claimed is:

1. A method for operating a base station in a wireless communication system, the method comprising:
   receiving, from a terminal, a message;
   detecting an integrity check value (ICV) error of the message, while a first traffic encryption key (TEK) for downlink is a first key and a second TEK for uplink is a second key;
   determining that update of the second TEK used for encrypting data by the terminal is required due to the ICV error;
   performing a first key update procedure by discarding the first key, using the second key associated with the ICV error as the first TEK, deriving a third key, and using the third key as the second TEK;
   after performing the first key update procedure, performing a second key update procedure by discarding the second key, using the third key as the first TEK, deriving a fourth key, and using the fourth key as the second TEK;
   transmitting, to the terminal, a TEK invalid message informing that a TEK is invalid, after performing the second key update procedure;
   receiving, from the terminal, a TEK request message, after transmitting the TEK invalid message; and
   transmitting, to the terminal, a TEK_reply message comprising the third key and the fourth key.

2. The method of claim 1, wherein the message comprises one of a control message and a medium access control (MAC) protocol data unit (MPDU).

3. The method of claim 1, wherein detecting the ICV error of the message comprises detecting the ICV error of the message by comparing a first ICV with a second ICV.

4. The method of claim 3, wherein the first ICV comprises a value included in the message, and the second ICV comprises a value derived from the second key.

5. The method of claim 1, further comprising: discarding the received message.

6. The method of claim 1, wherein the first TEK is updated based on a key agreement algorithm.

7. The method of claim 1, wherein the TEK request message is transmitted from the terminal when the terminal determines that a MPDU received from the base station is encrypted using the second TEK held by the terminal.

8. An apparatus of a base station in a wireless communication system, the apparatus comprising:
   a transceiver; and
   at least one processor coupled to the transceiver and configured to:
   receive, from a terminal, a message,
   detect an integrity check value (ICV) error of the message, while a first traffic encryption key (TEK) for downlink is a first key and a second TEK for uplink is a second key,
   determine that update of the second TEK used for encrypting data by the terminal is required due to the ICV error,
   perform a first key update procedure by discarding the first key, using the second key associated with the ICV error as the first TEK, deriving a third key, and using the third key as the second TEK,
   after performing the first key update procedure, perform a second key update procedure by discarding the second key, using the third key as the first TEK, deriving a fourth key, and using the fourth key as the second TEK,
   transmit, to the terminal, a TEK invalid message informing that a TEK is invalid, after performing the second key update procedure,
   receive, from the terminal, a TEK request message, after transmitting the TEK invalid message, and
   transmit, to the terminal, a TEK_reply message comprising the third key and the fourth key.

9. The apparatus of claim 8, wherein the message comprises one of a control message and a medium access control (MAC) protocol data unit (MPDU).

10. The apparatus of claim 8, wherein the at least one processor is further configured to detect the ICV error of the received message by comparing a first ICV with a second ICV.

11. The apparatus of claim 10, wherein the first ICV comprises a value included in the received message, and the second ICV comprises a value derived from the second key.

12. The apparatus of claim 8, wherein the at least one processor is further configured to discard the message.

13. The apparatus of claim 8, wherein the first TEK is updated based on a key agreement algorithm.

14. The apparatus of claim 8, wherein the TEK request message is transmitted from the terminal when the terminal determines that a MPDU received from the base station is encrypted using the second TEK held by the terminal.

* * * * *